US010887424B2

(12) United States Patent
Possing et al.

(10) Patent No.: US 10,887,424 B2
(45) Date of Patent: Jan. 5, 2021

(54) OPPORTUNITY EVENTS

(71) Applicant: Microsoft Technology Licensing, LLC, Redmond, WA (US)

(72) Inventors: Denis Possing, Issaquah, WA (US); Gail Giacobbe, Seattle, WA (US); Jane Kim, Seattle, WA (US); Ruth Kikin-Gil, Bellevue, WA (US); Bojana Ostojic, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 227 days.

(21) Appl. No.: 15/833,788

(22) Filed: Dec. 6, 2017

(65) Prior Publication Data

US 2018/0097909 A1 Apr. 5, 2018

Related U.S. Application Data

(63) Continuation of application No. 14/175,971, filed on Feb. 7, 2014, now Pat. No. 9,871,883.

(51) Int. Cl.
*G06Q 10/10* (2012.01)
*H04L 29/08* (2006.01)

(52) U.S. Cl.
CPC ............ *H04L 67/306* (2013.01); *H04L 67/22* (2013.01)

(58) Field of Classification Search
CPC ............... G06F 15/177; G06F 16/9535; G06F 3/04847; G06F 16/951; G06F 16/9537;
(Continued)

(56) References Cited

U.S. PATENT DOCUMENTS 7,974,983 B2 7/2011 Goeldi
8,131,271 B2 3/2012 Ramer et al.
(Continued)

FOREIGN PATENT DOCUMENTS

CN 101438227 A 5/2009
CN 102246588 A 11/2011
(Continued)

OTHER PUBLICATIONS

"Final Office Action Issued in U.S. Appl. No. 14/175,971", dated Nov. 25, 2016, 41 Pages.
(Continued)

*Primary Examiner* — Di Xiao
(74) *Attorney, Agent, or Firm* — Rainier Patents, P.S.

(57) ABSTRACT

The description relates to opportunity events. One example can filter events based upon at least one parameter from a profile of a user. The filtering can produce potential opportunity events for the user. The example can compare the potential opportunity events to the user profile utilizing a similarity threshold such that the potential opportunity events that satisfy the similarity threshold are considered opportunity events. The example can rank the opportunity events by confidence level of matching the user profile. The example can also automatically populate high ranking individual opportunity events onto a calendar of the user. The example can further notify the user about the automatically populating.

20 Claims, 8 Drawing Sheets

Related U.S. Application Data

(60) Provisional application No. 61/829,842, filed on May 31, 2013.

(58) Field of Classification Search
CPC .... G06F 16/958; G06F 3/0482; G06F 16/248; G06F 16/9566; G06F 16/9577; G06F 16/972; G06F 17/248; G06F 19/3481; G06F 16/335; G06F 1/1683; G06F 1/266; G06F 1/3203; G06F 1/3209; G06F 1/3212; G06F 2200/261; G06F 3/0484; G06F 16/156; G06F 16/2246; G06F 16/24578; G06F 16/283; G06F 16/285; G06F 16/29; G06F 16/3347; G06F 16/35; G06F 16/639; G06F 16/68; G06F 16/9035; G06F 16/9038; G06F 17/246; G06F 17/5009; G06F 19/3418; G06F 19/3475; G06F 1/163; G06F 21/6245; G06F 21/6254; G06F 2203/011; G06F 2203/04808; G06F 3/015; G06F 3/017; G06F 3/0346; G06F 3/0481; G06F 3/04842; G06F 3/04883; G06F 3/04886; G06F 8/34; G06F 8/36; G06F 8/60
See application file for complete search history.

(56) References Cited

U.S. PATENT DOCUMENTS

| | | | |
|---|---|---|---|
| 8,244,566 B1 | 8/2012 | Coley et al. | |
| 9,118,724 B1* | 8/2015 | Sooriyan | H04W 4/21 |
| 2005/0235061 A1 | 10/2005 | Debber et al. | |
| 2007/0143412 A1 | 6/2007 | Qi | |
| 2007/0156494 A1 | 7/2007 | Boss et al. | |
| 2008/0243582 A1 | 10/2008 | Chen et al. | |
| 2008/0281665 A1 | 11/2008 | Opaluch | |
| 2009/0124241 A1 | 5/2009 | Krishnaswamy et al. | |
| 2009/0222344 A1 | 9/2009 | Greene et al. | |
| 2009/0299807 A1 | 12/2009 | Schiller et al. | |
| 2010/0005480 A1 | 1/2010 | Mallempati et al. | |
| 2010/0122190 A1* | 5/2010 | Lu | G06Q 10/06311 715/764 |
| 2010/0185552 A1 | 7/2010 | Deluca et al. | |
| 2010/0332326 A1 | 12/2010 | Ishai | |
| 2010/0333137 A1 | 12/2010 | Hamano et al. | |
| 2011/0184772 A1* | 7/2011 | Norton | G06Q 10/02 705/7.18 |
| 2011/0213785 A1 | 9/2011 | Kristiansson et al. | |
| 2011/0302182 A1 | 12/2011 | Crawford | |
| 2012/0260190 A1 | 10/2012 | Berger et al. | |
| 2013/0090980 A1 | 4/2013 | Hummel | |
| 2013/0124663 A1 | 5/2013 | Jain et al. | |
| 2013/0262171 A1* | 10/2013 | Solodko | G01C 21/343 705/7.18 |
| 2014/0282040 A1 | 9/2014 | Alfaro | |
| 2015/0324751 A1* | 11/2015 | Orenstein | G06F 19/3481 702/3 |

FOREIGN PATENT DOCUMENTS

| | | |
|---|---|---|
| EP | 2391090 A1 | 11/2011 |
| WO | 2013057150 A1 | 4/2013 |
| WO | 2014193883 A2 | 12/2014 |

OTHER PUBLICATIONS

"Non-final Office Action Issued in U.S. Appl. No. 14/175,971", dated Apr. 14, 217, 52 Pages.

"Non-final Office Action Issued in U.S. Appl. No. 14/175,971", dated Mar. 28, 2016, 24 Pages.

"Notice of Allowance Issued in U.S. Appl. No. 14/175,971", dated Sep. 12, 2017, 14 Pages.

"Communication Pursuant to Rules 70(2) and 70a(2) Issued in European Application No. 14736506.8", dated Mar. 21, 2017, 1 Page.

"Response filed to the Communication Pursuant to Rules 70(2) and 70a(2) Issued in European Application No. 14736506.8", dated Apr. 28, 2017, 14 Pages.

"Search Report Issued in European Application No. 14736506.8", dated Mar. 2, 2017, 16 Pages.

"Application Filed as U.S. Appl. No. 61/829,842", filed May 31, 2013, 42 Pages.

Germanakos, et al., "Personalization Systems and Processes Review based on a Predetermined User Interface Categorization", In Proceedings of the III International Conference on Communication and Reality, Digital Utopia in the Media: From Discourses to Facts, Oct. 30, 2012, 12 Pages.

Lu, et al., "Twitter User Modeling and Tweets Recommendation Based on Wikipedia Concept Graph", In Proceedings of the Intelligent Techniques for Web Personalization and Recommender Systems AAAI Technical Report WS-12-09, Jul. 12, 2015, 6 Pages.

Nori, et al., "Exploiting User Interest on Social Media for Aggregating Diverse Data and Predicting Interest", In Proceedings of the Fifth International AAAI Conference on Weblogs and Social Media, Jul. 5, 2011, 8 Pages.

"International Preliminary Report on Patentability Issued in PCT Application No. PCT/US2014/039659", dated Feb. 11, 2016, 6 Pages.

"International Search Report & Written Opinion Issued in PCT Application No. PCT/US2014/039659", dated Jan. 12, 2016, 7 Pages.

Wang, et al., "Learning Relevance from Heterogeneous Social Network and Its Application in Online Targeting", In Proceedings of the 34th International ACM SIGIR Conference on Research and Development in Informational Retrieval, Jul. 24, 2011, 10 Pages.

"Office Action Issued in European Patent Application No. 14736506.8", dated Oct. 10, 2018, 7 Pages.

"Office Action Issued in European Patent Application No. 14736506.8", dated Mar. 29, 2018, 7 Pages.

"Office Action Issued in Chinese Patent Application No. 201480031368.2", dated Jan. 28, 2019, 10 Pages.

"Second Office Action Issued in Chinese Patent Application No. 201480031368.2", dated Jun. 28, 2019, 6 Pages.

"Final Office Action Issued in Chinese Patent Application No. 201480031368.2", dated Nov. 5, 2019, 7 Pages.

* cited by examiner

FIG. 4

OPPORTUNITY EVENTS

BACKGROUND

Electronic calendars have been in use for quite some time. However, many events never make it to the calendar because of the perceived inconvenience to the user to manually add the event to his/her calendar. For instance, the user may think it takes too long to add the event to his/her calendar. As a result, the user may procrastinate and not add the event to the calendar or may just write it down on a piece of paper. Further, the user may be utilizing a type of device, such as a smart phone, that does not lend itself to traditional manual calendar entry. Further, in many cases, users tend not to even be aware of many events that they may be interested in. As such, the user's electronic calendar tends to be an incomplete representation of their schedule, which may cause them to inadvertently double-book events or miss events because they forget about them or never know about them.

SUMMARY

The described concepts relate to opportunity events. From one perspective, an opportunity event can be an event that the user is likely to be interested in, but is unlikely to become aware of in his/her normal routine. One example implementation can filter events based upon at least one parameter from a profile of a user. The filtering can produce potential opportunity events for the user. The example can compare the potential opportunity events to the user profile utilizing a similarity threshold such that the potential opportunity events that satisfy the similarity threshold are considered opportunity events. The method can rank the opportunity events by confidence level of matching the user profile. The method can also automatically populate high ranking individual opportunity events onto a calendar of the user. The method can further notify the user about the calendared opportunity events.

Another example can include a display, storage having instructions stored thereon, and a processor. The processor can be configured to process the instructions to create a graphical user interface (GUI) on the display. The GUI can include one or more opportunity events selected for a user based upon a profile of the user (e.g., user profile). The GUI can be configured to allow the user to cause an individual opportunity event to be populated on a calendar associated with the user.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIGS. 3-6 illustrate computing devices which can accomplish opportunity event functionalities in accordance with some implementations of the present concepts.

DETAILED DESCRIPTION

Overview

This patent relates to auto-calendaring and more particularly to auto-generation of potential calendar events. There are many events that a user would attend if only they were aware of them. Previously, people needed to proactively search for events or hear about them from friends or discover them through marketing. The present concepts can build a profile about the user. The profile can be used to provide a tailored list of events (e.g., "opportunity events") the user may want to attend. These opportunity events can be presented to the user in various ways, such as on a personal calendar, family calendar, work calendar, or in another manner. Some implementations may determine a confidence score for an individual opportunity event. The confidence score can be used to determine how the individual event is presented to the user.

First System Examples

Figure 1:
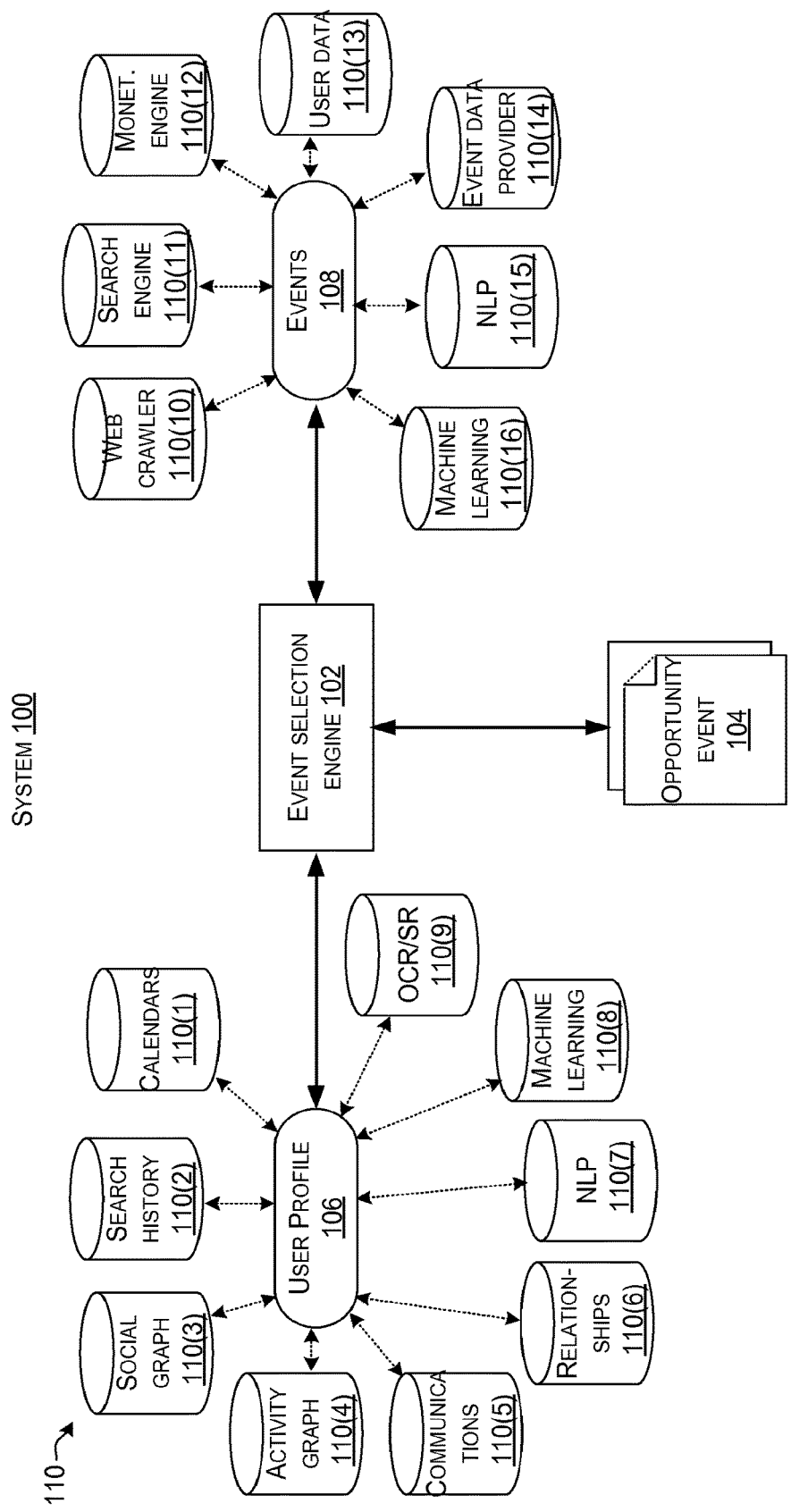
FIGS. 1 and 7 illustrate examples of systems which can accomplish opportunity event functionalities in accordance with some implementations of the present concepts.

FIG. 1 shows a system 100 that can identify opportunity events that are customized to an individual user. In this case, system 100 includes an event selection engine 102 that is configured to generate an opportunity event(s) 104. The event selection engine 102 can generate the opportunity event 104 by utilizing a user profile 106 and events 108. The user profile 106 and the events 108 can be generated utilizing resources 110. Multiple examples of resources 110 are described relative to the user profile 106 and the events 108. The listed resources are provided for purposes of explanation and are not intended to be limiting or exhaustive.

The resources 110 illustrated relative to the user profile 106 include calendars 110(1), search history 110(2), social graph 110(3), activity graph 110(4), communications 110(5), relationships 110(6), natural language processing and/or natural language generation (NLP) 110(7), machine learning processing 110(8), and optical character recognition and speech recognition processing (OCR/SR) 110(9). Of course, not all contemplated resources can be illustrated due to space constraints on the drawing page. For example, another resource can be a crowd-sourced repository of events.

The resources 110 illustrated relative to the events 108 include a web crawler 110(10), a search engine 110(11), a monetization engine 110(12), user data 110(13), event data provider 110(14), NLP 110(15), and/or machine learning processing 110(16).

Calendars 110(1) can be any personal and/or work calendars associated with the user. The calendars can also relate to people or entities that the user has relationships with. For instance, the calendars may include calendars of the user's family and friends. Further, the calendars can include any calendars that the user subscribes to. For instance, the user may subscribe to his/her gym's calendar to see when particular fitness classes are being taught. Similarly, the user may subscribe to his/her children's school calendar to see upcoming events at the school. The calendars can provide information about what the user is interested in and what events the user has attended in the past and with whom. Further, the calendars can provide forward looking information about events the user has scheduled for themselves, when, and with whom.

Search history 110(2) can provide information about the user interests based upon what the user searched for on the Internet. Social graph 110(3) can indicate relationships between the user and other people. Social graphs can be obtained from social websites that the user participates in, who the user emails, and/or who the user texts. Knowledge about these people's activities can be useful in determining what events the user might be interested in and whom the user may attend the events with.

In the case of the crowd-sourced event repository, if a friend or family member enters a series of dates for the soccer team's upcoming season (for example), they might consent to share these events with other users. The system can in turn store the list of events in a central database and present them as "opportunity events". Alternatively, the crowd-sourced event repository can be utilized as "potential opportunity events" that can be considered for presentation to a user according to the concepts described above and below.

Activity graph 110(4) can provide information about what events the user has participated in the past and/or intends to participate in. The information can include where the events are at, when they occur, and whom the user does them with. An example activity graph is illustrated relative to FIG. 2.

Communications 110(5), can include emails, texts, phone numbers, social network related information (such as Facebook friends, Twitter followers, etc.), among others, that the user sent or received. The communications can provide information about what the user discusses and whom he/she discussed it with. Relationships 110(6) can provide information about the people the user interacts with in the social graph 110(3), activity graph 110(4), and/or communications 110(5).

NLP 110(7) can extract useful information from the calendars 110(1), search history 110(2), social graph 110(3), activity graph 110(4), communications 110(5), relationships 110(6), etc. Machine learning process 110(8) can process the information obtained from the NLP 110(7) and/or any of the other resources. OCR/SR 110(9) can be used to convert images and voice, among others, into text that is useable by the NLP 110(7) and the machine learning processing 110(8).

On the events 108 side, the web crawler 110(10) can index websites for the search engine. Search engine 110(11) can search the Internet for terms. Some of these terms can be indicative of events.

Monetization engine 110(12) can provide events for specific entities. The entities can pay to have their events included in the events supplied to the event selection engine 102, pay if the event selection engine generates an opportunity event 104 from the event, and/or pay if the user accepts and/or attends the opportunity event 104, and/or pay if the user forwards the opportunity event to other users. For instance, a sports team or a ticket vendor could pay to have their events included for consideration by the event selection engine 102 relative to users that have a user profile that indicates that the user may be interested in the event.

User data 110(13) can include the user profile 106, any of the information utilized to generate the user profile, and/or other information related to the user, such as articles written by the user. Event data provider 110(14) can include events provided by an entity that organizes events by topic, location, and/or date. NLP 110(15) and machine learning processing 110(16) can be utilized to find patterns and relationships in the event data that may not otherwise be evident utilizing word matching techniques. Thus, content can be evaluated utilizing various techniques to identify events 108.

Note that while the illustration of FIG. 1 captures a static moment of system 100, the system can be dynamic. For instance, as the user profile 106 becomes more robust, the user profile can be used to customize the types of events 108 that are identified and provided to the event selection engine 102. For example, if the user's calendar indicates that the user is going to be in San Francisco, Calif. on a given day for a business trip, the events 108 for that day can be filtered relative to that location. Similarly, the user's current location can also be used as a filter. For example, if the user is in downtown Chicago and is looking for something to do in the next hour, the system can filter out events in other parts of the city, or events that are happening at other times in the day.

Further, while distinct elements are illustrated in system 100 with defined relationships, in some instances the configuration may be more amorphous. For instance, the event selection engine 102 may create the user profile 106 and then may be utilizing the user profile to select opportunity events 104 and simultaneously update the user profile based upon user reactions to the opportunity events. For instance, the event selection engine may determine that the user's primary interest is soccer and their secondary interest is going to concerts. However, if the user keeps accepting concert opportunity events and declining soccer game opportunity events, the event selection engine may re-evaluate the user interests in the user profile.

The event selection engine 102 may find particular scenarios to be especially definitive. For instance, assume the event selection engine suggested an opportunity event for a soccer game on the same day (and maybe even the same time) as an opportunity event for a concert. If the user selected the concert instead of the soccer game, the event selection engine can update the user profile. The event selection engine can update the user profile broadly, such as by switching the order of interest of soccer and concerts. Alternatively, the event selection engine can update the user profile relative to the specific band or type of music at the concert relative to the specific soccer teams. Stated another way, the user may generally like soccer more than concerts, but if the user's favorite band is playing, the user may like concerts more.

Note that some of the resources 110 relate to personal information of, or about, the user. The user can be notified before any personal information is gathered or utilized. Further, the user can be allowed to specify what kinds of his/her data are used and how. For instance, the user may authorize gathering who they correspond with via email, but not authorize the use of the content within the emails. Alternatively or additionally to automatically gathering information for their user profile 106, the user may want to manually enter information to the user profile (and/or update or change the user profile). Regardless of how the user profile information is obtained, the information can be handled at all times in a manner that protects the user's security, privacy, and confidences.

Viewed from one perspective, the event selection engine 102 can facilitate forming and updating the user profile 106. The user profile can allow the event selection engine to have an advanced understanding of a user's interests and intent. The event selection engine can organize information from the user profile into categories, such as by event type and event location. Categories can provide parameters. For instance, a category may be 'soccer' and the associated parameters may relate to 'who', 'when', and/or 'where' the user has engaged in soccer activities. The event selection engine can utilize these categories to sort events 108 to identify potential opportunity events. For instance, the event selection engine may determine from the user profile that the user is interested in attending soccer games in the Seattle area. The event selection engine can then look for events 108 that match these categories (e.g., identify potential opportunity events). In one configuration, parameter values relating to the event can be determined and the parameter values can be utilized to calculate an event value for the event.

Stated another way, the event selection engine 102 can filter events 108 based upon the user profile 106. For instance, the event selection engine could determine from the user profile 106 that the user lives near Seattle, Wash. and enjoys going to Seattle Sounder soccer games. The event selection engine 102 can then filter the events 108 utilizing terms such as "soccer", "Seattle", "Seattle Sounders™", and/or "home games". (The inventors and assignee of the present patent have no relationship with the Seattle Sounders™ and this term is simply used for purposes of explaining the inventive concepts to the reader through a real life example). Further, the event selection engine 102 can filter out past events and focus on future events that the user may want to attend. The events 108 that emerge from the filtering can be considered 'potential opportunity events'.

The event selection engine 102 can further evaluate the potential opportunity events selected from the events 108. The event selection engine can rank the potential opportunity events for the user according to how closely they align with the user's profile 106 and the profiles of people that overlap with the user. In one configuration, the event selection engine can compare the ranked potential opportunity event to a threshold. Those ranked potential opportunity events that satisfy the threshold can be treated as opportunity events 104. The event selection engine can determine a confidence level for the opportunity events 104 based upon the event value.

In some implementations, event selection engine 102 can add opportunity events 104 with the highest confidence level directly to the user's calendar and inform them via their preferred communication method (e-mail, SMS, Skype, etc.). One such example is described below relative to FIG. 3. For opportunity events 104 with a medium level of certainty of interest, the event selection engine can add the opportunity events to an opportunity calendar associated with the user. One such example is described below relative to FIGS. 4-6. Lower ranking opportunity events can be stored for the user to examine at his/her discretion. Of course, the dynamic nature of the present concepts can allow the user to ask for more opportunity events 104 like a specific opportunity event. The event selection engine 102 can repeat the event analysis in light of the user's feedback in an iterative manner. Similarly, the user may specify not to receive future opportunity events that are similar to one noted by the user. Again the user profile 106 can be updated with this user feedback. Other user actions can also be utilized in updating the user profile. For instance, user acceptance of an event can positively influence that event type in the user profile whereas declining the event can negatively influence the user profile. User acceptance along with forwarding and/or inviting other users can have an even greater positive influence. Further, whether the user actually attended or participated in the event can be a further positive factor. Thus, some user actions can be used as positive indicators of the accuracy of the user profile while other user actions are negative indicators. The process can be performed iteratively, often in a continually ongoing manner.

As introduced above, the event selection engine 102 can use the user's treatment of the opportunity events 104 to further refine or update the user profile 106. For instance, if the user tends to accept one category of opportunity event 104, but not another category, the user profile can be updated to reflect this information. Further, if the user invites other people to the opportunity event, this information can be added to the user profile so that those people's schedules can be checked for the next similar opportunity event. The user's act of inviting other people may also be considered indicative that the user liked the opportunity event and thus the user's profile can be updated accordingly and/or the confidence level in the opportunity event can be increased. The act of the user forwarding the opportunity event to others could be treated in a similar fashion in that the user is unlikely to forward a calendar event the he/she is not interested in.

Returning to the above scenario where the user invites others to the calendar event, in one case, if these people's schedules are busy for the next such opportunity event, this information may weigh against presenting that event to the user since the user is less likely to go if the people cannot go. In other cases, these people may automatically be added as invitees to the next such opportunity event that is presented to the user.

As use increases, user profiles can overlap (e.g., user and friends, user and family, user and co-workers, etc.). This overlap can provide more information than a single user profile 106 taken in isolation. For instance, this information could be used to create overlaying aspects of the user profile for a user's broader graph to construct a set of group profiles for the user, their inner circle, slightly wider circles, and/or their broadest circle. These group profiles can enable the event selection engine 102 to more accurately assess the potential match of a given new potential opportunity event to the user.

In summary, the user profile 106 can indicate details of what the user tends to do and/or other details, such as whom they do certain types of events with and/or where they do them. Further, the user profile can be searchable in various ways. For example, the user may tend to engage in certain types of events during the week after work with people from work and engage in different activities on the weekend with different people. This information can contribute to the accuracy of identifying the correct opportunity events 104 for the user profile.

The event selection engine 102 can aid the user in managing his/her user profile if the user so desires. Further, the event selection engine can aid the user in creating a user account or otherwise configuring auto-calendaring services relating to opportunity events 104. For instance, the user can identify who they are (e.g., supply their account information) and indicate which calendar(s) they want the opportunity events to be populated to. For instance, the user may define that certain types of opportunity events be calendared to their work calendar and other types of opportunity events be calendared to their private calendar. In another case, multiple calendaring options can be presented to the user relative to opportunity events. The user can then decide how to handle individual opportunity events. One such example is discussed relative to FIGS. 4-6.

Figure 2:
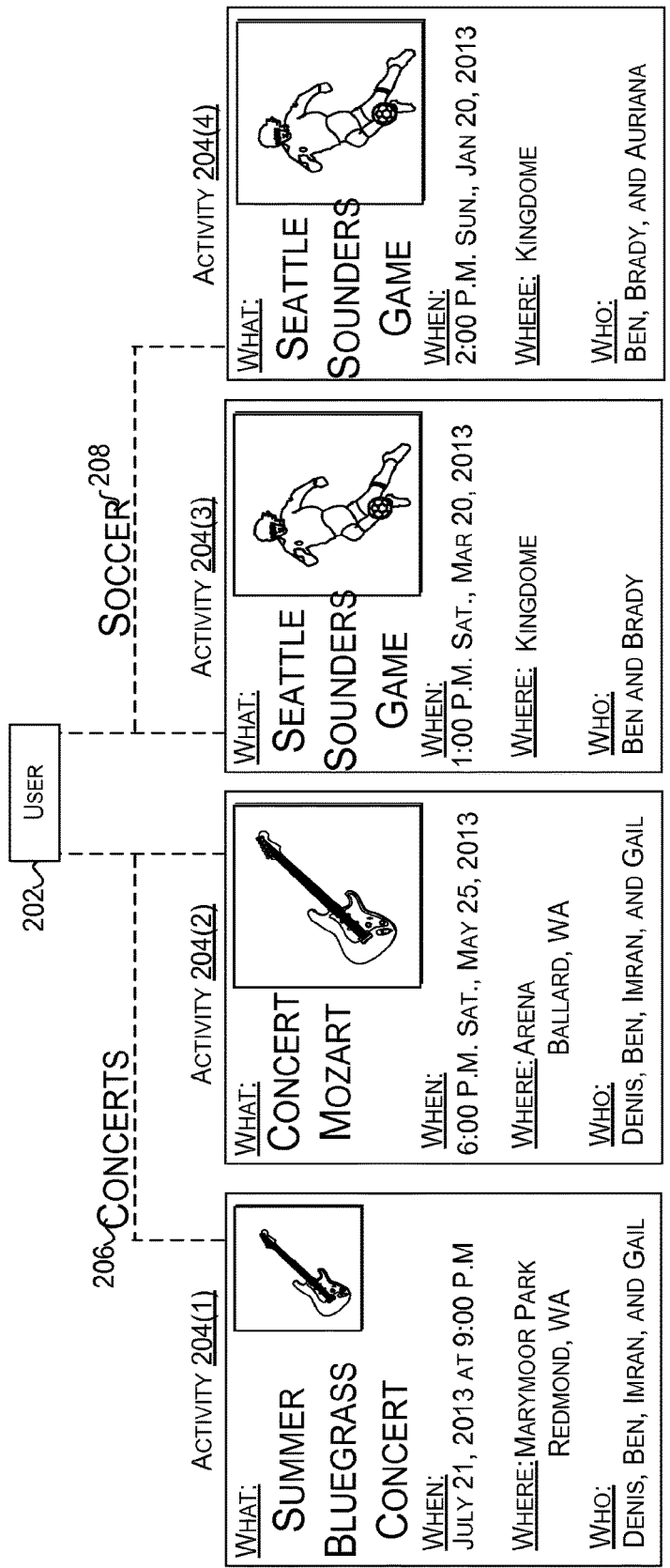
FIG. 2 shows an example of an activity graph from FIG. 1 in accordance with some implementations of the present concepts.

FIG. 2 shows an example of activity graph 110(4) for the user 202 (introduced but not designated relative to FIG. 1). In this case, the activity graph shows four activities 204(1)-204(4) that the user has engaged in. In this example, activities 204(1) and 204(2) are organized as relating to concerts as indicated at 206. Activities 204(3) and 204(4) are organized as relating to soccer as indicated at 208.

The activity graph 110(4) can provide information about what types of activities the user is interested in. The information can be useful at various levels of granularity. For instance, the activity graph indicates that the user is interested in concerts 206, but more specifically summer outdoor concerts (assume that Marymoor Park and the Arena are outdoor venues). Further, the types of music that the user is interested in includes "Bluegrass" and "Mozart" as indicated in activities 204(1) and 204(2), respectively. The activity graph further indicates who the user may want to attend future events with.

The user may be more likely to accept an opportunity event 104 (FIG. 1) relating to summer outdoor concerts if the people that the user went with last time (e.g., "Denis, Ben, Imran, and Gail") are also going (or have open calendars on the day and time of the concert). As time goes on and the user engages in more events, the event selection engine 102 (FIG. 1) can both utilize and update the activity graph 110(4) and the user profile 106 (FIG. 1). Thus, the activity graph can provide useful information for the user profile. This information can be used to evaluate events for inclusion as opportunity events.

First Opportunity Calendar Scenario

Figure 3:
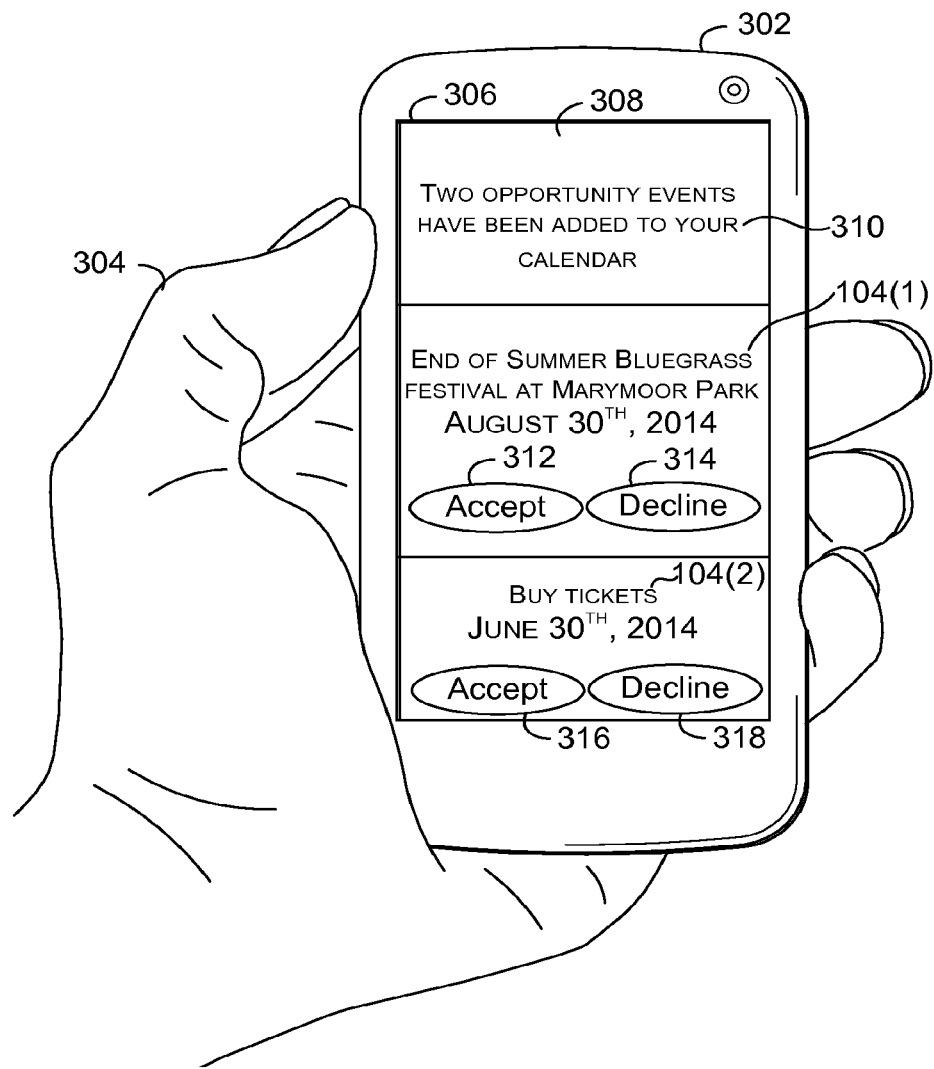

FIG. 3 shows a first opportunity calendar scenario that continues the examples described above relative to FIG. 2. FIG. 3 shows a device 302 manifest as a smart phone belonging to a user 304. In this case, the device 302 includes a display 306. A graphical user interface (GUI) 308 on the display relates to opportunity events. In this case, the GUI 308 indicates that "Two opportunity events have been added to your calendar" at 310. The first opportunity event 104(1) is an "End of Summer Bluegrass Festival at Marymoor Park". The date is "Aug. 30, 2014". The user can accept the opportunity event at 312 or reject the opportunity event at 314. (Though not specifically illustrated, the user could take other actions, such as invite others, or forward, among other options). The second opportunity event 104(2) is to "Buy tickets" for the first opportunity event. The date of the second opportunity event is "Jun. 30, 2014". Thus, the system determined that buying tickets for the first event was potentially important and automatically determined when the tickets go on sale for the user. The user can accept the second opportunity event at 316 or decline at 318. As mentioned above, the system can use the user interaction with one opportunity event as guidance for other events. For instance, in this case if the user declined the first opportunity event, the second could be automatically deleted. Further, while the illustration shows a snap shot in time, the opportunity events can be monitored for the user. For instance, the date or time of the concert could be changed or the date and time the tickets become available can change. The system can monitor the events and update the opportunity events accordingly and/or provide other information to the user.

In summary, FIG. 3 provides an example of a configuration where opportunity events can be automatically added to a user's calendar. In this example, the user can then accept or decline the opportunity events. As mentioned above relative to FIG. 1, in some cases, the manner in which an opportunity event is added to the calendar and/or the degree of user involvement can be based upon a confidence that the opportunity event is one which the user would want to participate in. The confidence can relate to a probability that the user will want to participate in the opportunity event. In a case where the confidence is very high, the opportunity event may be placed on the user's calendar without even notifying the user. If the confidence is lower, the opportunity event may be placed on the user's calendar and the user queried about whether he/she wants to keep it (e.g., the illustrated example of FIG. 3).

Second Opportunity Calendar Scenario

Figure 4:
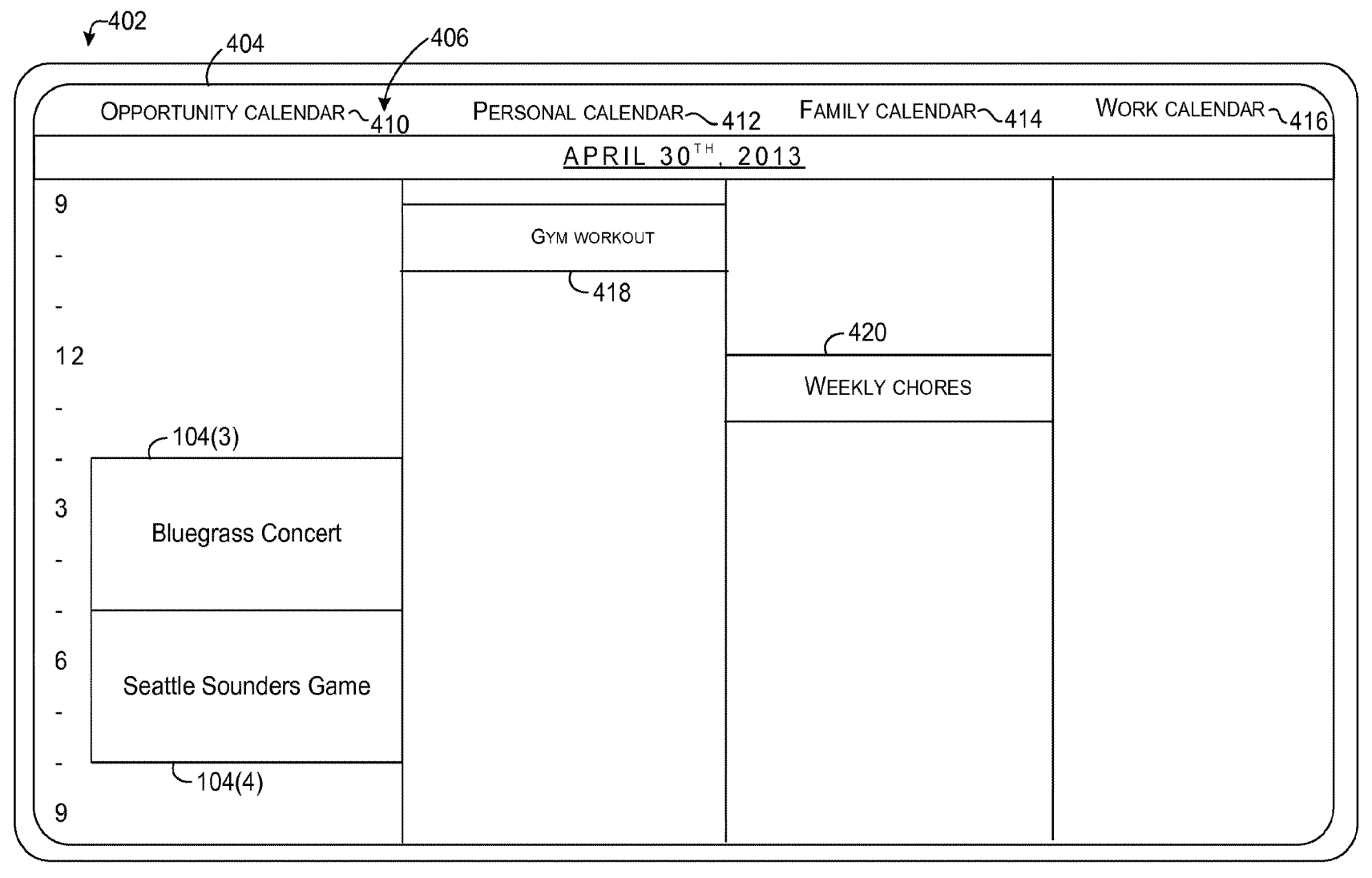
Figure 5:
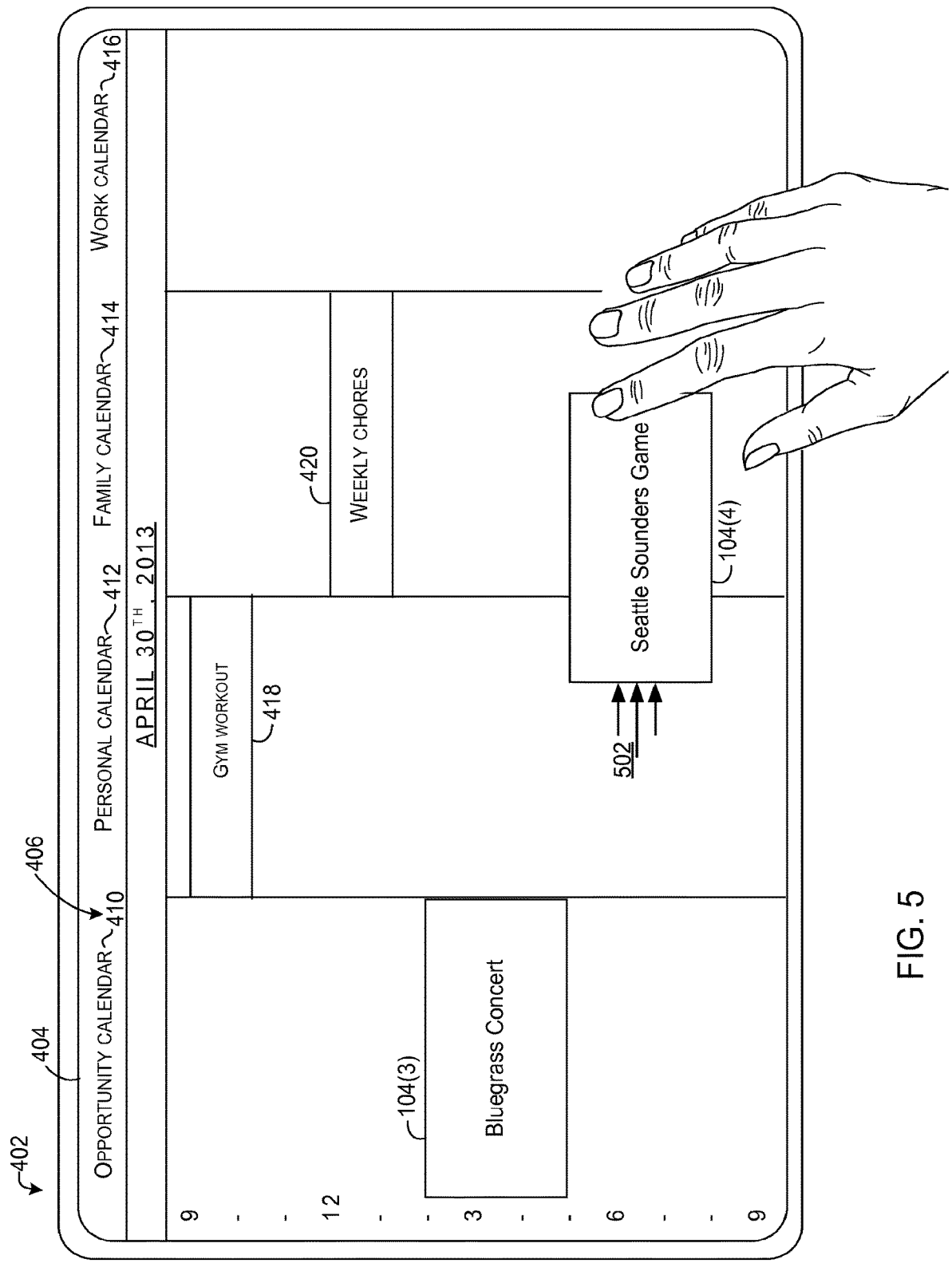
Figure 6:
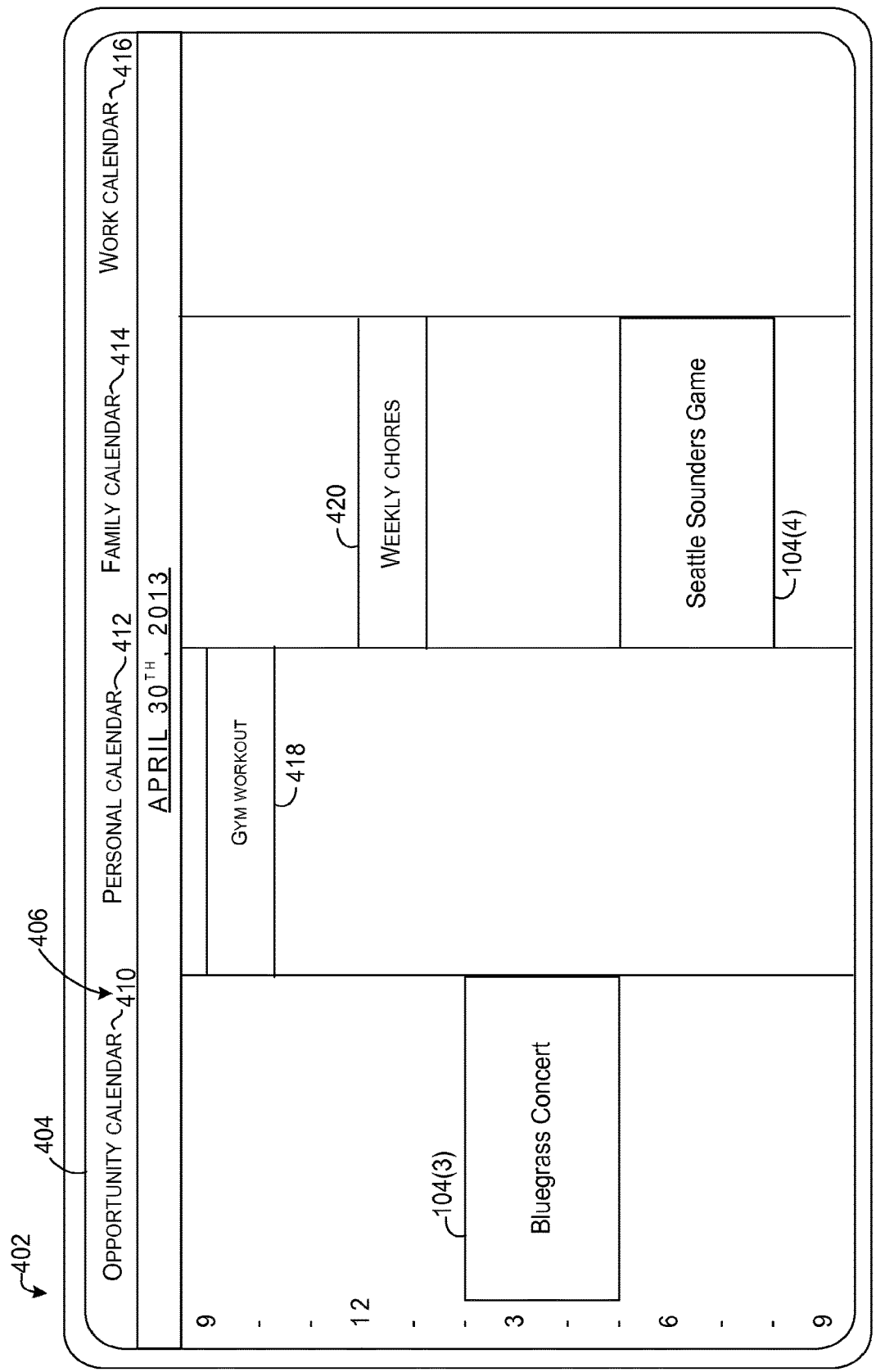

FIGS. 4-6 collectively show a second opportunity calendar scenario that continues the examples described above relative to FIG. 2. FIG. 4 shows a device 402 manifest as a tablet type computer. In this case, the device 402 includes a display 404. A GUI 406 on the display relates to an opportunity calendar 410 for the user. The GUI also shows the user's personal calendar 412, family calendar 414, and work calendar 416. Each calendar shows a view of Apr. 30, 2013. The user has a calendar item 418 on his/her personal calendar and another calendar item 420 on his/her family calendar.

An opportunity event 104(3) is shown on opportunity calendar 410 at 2:00 P.M. In this case, opportunity event 104(3) relates to a Bluegrass Concert. Another opportunity event 104(4) is shown on opportunity calendar 410 at 5:00 P.M. In this case, opportunity event 104(4) relates to a Seattle Sounders Game. The user can review the opportunity events 104(3) and 104(4) and decide whether to add the opportunity events to any of the user's calendars 412, 414, or 416. Assume in this case that the user reviews the opportunity events and decides he/she wants to attend the Seattle Sounders Game (e.g., opportunity event 104(4)) but not the Bluegrass Concert (e.g., opportunity event 104(3)). In this case, the user wants to attend the game with his/her family and as such wants to add this opportunity event to the family calendar 414.

FIG. 5 shows one example of how the user can add the opportunity event 104(4) to his/her family calendar 414. In this case, the user is dragging-and-dropping the opportunity event 104(4) to the family calendar 414 as indicated by arrows 502. Which calendar the user adds the opportunity event to can provide additional information about who the user attends this type of event with and hence what calendar similar future calendar events may be auto-populated to.

FIG. 6 shows the result of the user action with opportunity event 104(4) on the family calendar 414. In summary, FIGS. 4-6 provide an example where the opportunity events are identified for the user and added to an opportunity calendar. The user can review the opportunity events of the opportunity calendar and decide how the user wants to handle them. This information can then be used in an iterative manner to update the user profile and guide which opportunity events are presented in the future and in what manner. Further, the techniques can attempt to obtain additional information about the opportunity event to provide further iterative guidance. For instance, the techniques can attempt to determine whether the user actually attended the event. For example, did the user (e.g., via GPS tracking of the user's smartphone) actually go to the Seattle Sounder stadium at the date and time of the opportunity event? This additional information can provide further guidance about the user that may be more indicative of user preferences than merely accepting an opportunity event.

Second System Examples

Figure 7:
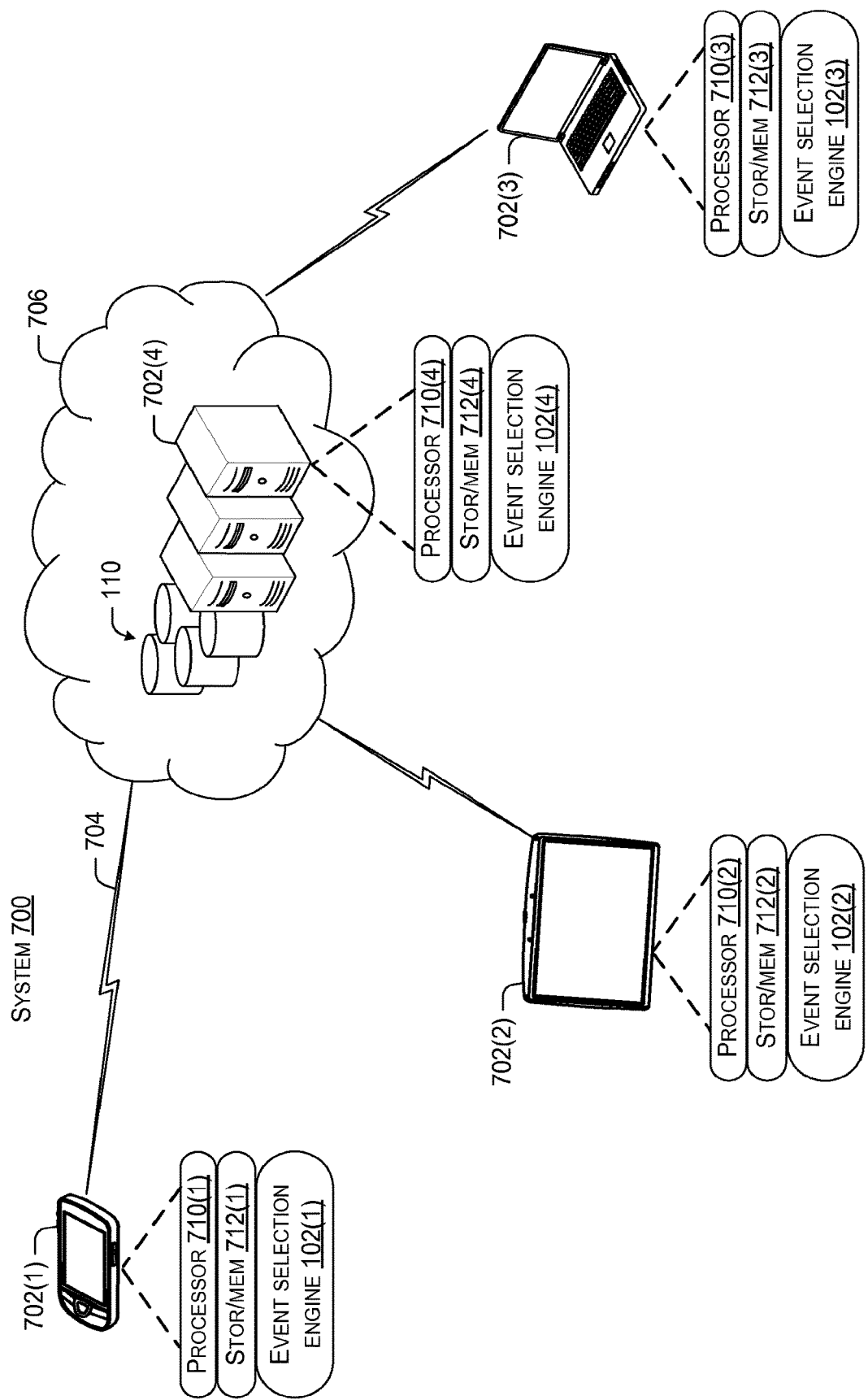

FIG. 7 shows a system 700 that can identify opportunity events that are customized to an individual user. In this case, system 700 includes four devices 702(1)-702(4). Device 702(1) is manifest as a smartphone and is similar to device 302 described relative to FIG. 3. Device 702(2) is manifest as a pad type computer and is similar to device 402 described relative to FIG. 4. Device 702(3) is manifest as a notebook type computer and device 702(4) is manifest as a server type computer. (In this discussion, the use of a designator with the suffix, such as "(1)", is intended to refer to a specific device instance. In contrast, use of the designator without a suffix is intended to be generic).

Of course not all device implementations can be illustrated and other device implementations should be apparent to the skilled artisan from the description above and below. For instance, further examples of devices 702 can include traditional computing devices, such as personal computers, servers, desktop computers, notebook computers, cell phones, smart phones, personal digital assistants, pad or table type computers, mobile devices, cameras, or any of a myriad of ever-evolving or yet to be developed types of computing devices. A mobile device can be any type of computing device that is readily transported by a user and may have a self-contained power source (e.g., battery).

The devices 702 can communicate over one or more networks 704 (represented by 'lightning bolts'). The devices can also communicate with resources 110. Examples of the resources are described above in relation to FIG. 1 and are not re-introduced here for sake of brevity. Further, due to space constraints, resources 110 are only illustrated in the Cloud 706. However, any of the devices 702 can maintain local instances of the resources and/or communicate with remote resources via network 704.

Devices 702 can include several elements which are defined below. For example, these devices can include a processor 710, storage/memory 712, and/or an event selection engine 102. The event selection engine can perform some or all of the opportunity event functionality described above. The devices 702 can alternatively or additionally include other elements, such as input/output devices (e.g., touch, voice, and/or gesture), buses, graphics cards, Wi-Fi circuitry, cellular circuitry, positional circuitry (absolute location (e.g., GPS)) and/or relative location (accelerometers, magnetometers, among others) etc., which are not illustrated or discussed here for sake of brevity.

The term "device", "computer", or "computing device" as used herein can mean any type of device that has some amount of processing capability and/or storage capability. Processing capability can be provided by one or more processors (such as processor 710) that can execute data in the form of computer-readable instructions to provide a functionality. Data, such as computer-readable instructions and/or user-related information, can be stored on storage, such as storage/memory 712 that can be internal or external to the computer. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage medium/media includes "computer-readable storage devices." Examples of computer-readable storage devices include volatile storage media, such as RAM, and non-volatile storage media, such as hard drives, optical discs, and flash memory, among others.

In the illustrated implementation, devices 702 are configured with a general purpose processor 710 and storage/memory 712. In some configurations, a device can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (GPUs), controllers, microcontrollers, processor cores, or other types of processing devices suitable for implementation both in conventional computing architectures as well as SOC designs.

In some configurations, the event selection engine 102 can be installed as hardware, firmware, or software during manufacture of the device 702 or by an intermediary that prepares the device for sale to the end user. In other instances, the end user may install the event selection engine 102, such as in the form of a downloadable application. Further, in some instances individual devices 702 can include robust event selection engines. In other cases individual devices may have less robust or thin event selection engines where a majority of the functionality is performed by other devices, such as cloud-based devices, for presentation on the thin device. In some cases, the local device (e.g., the user's device) can provide a web-view of content generated remotely, such as by the cloud-based devices.

Stated another way, in some implementations, an individual device, such as device 702(1) may have a less robust instance of the event selection engine 102(1) such that some or all of the functionality provided by the event selection engine 102(1) is performed remotely, such as at cloud-based device 702(4) and communicated back to device 702(1) for presentation to the user. Further, the event selection engine may include individual resources 110 or access individual resources. For example, the event selection engine may include a natural language processing/generation resource or may access a remote natural language processing/generation resource.

The event selection engine 102 can be a freestanding application or the event selection engine can be an element of a contact management application or a calendaring application, among others. Examples of contact management applications can include Outlook® from Microsoft® Corporation, Apple Contacts™, and/or Google Gmail™.

First Method Example

Figures 8, 9:
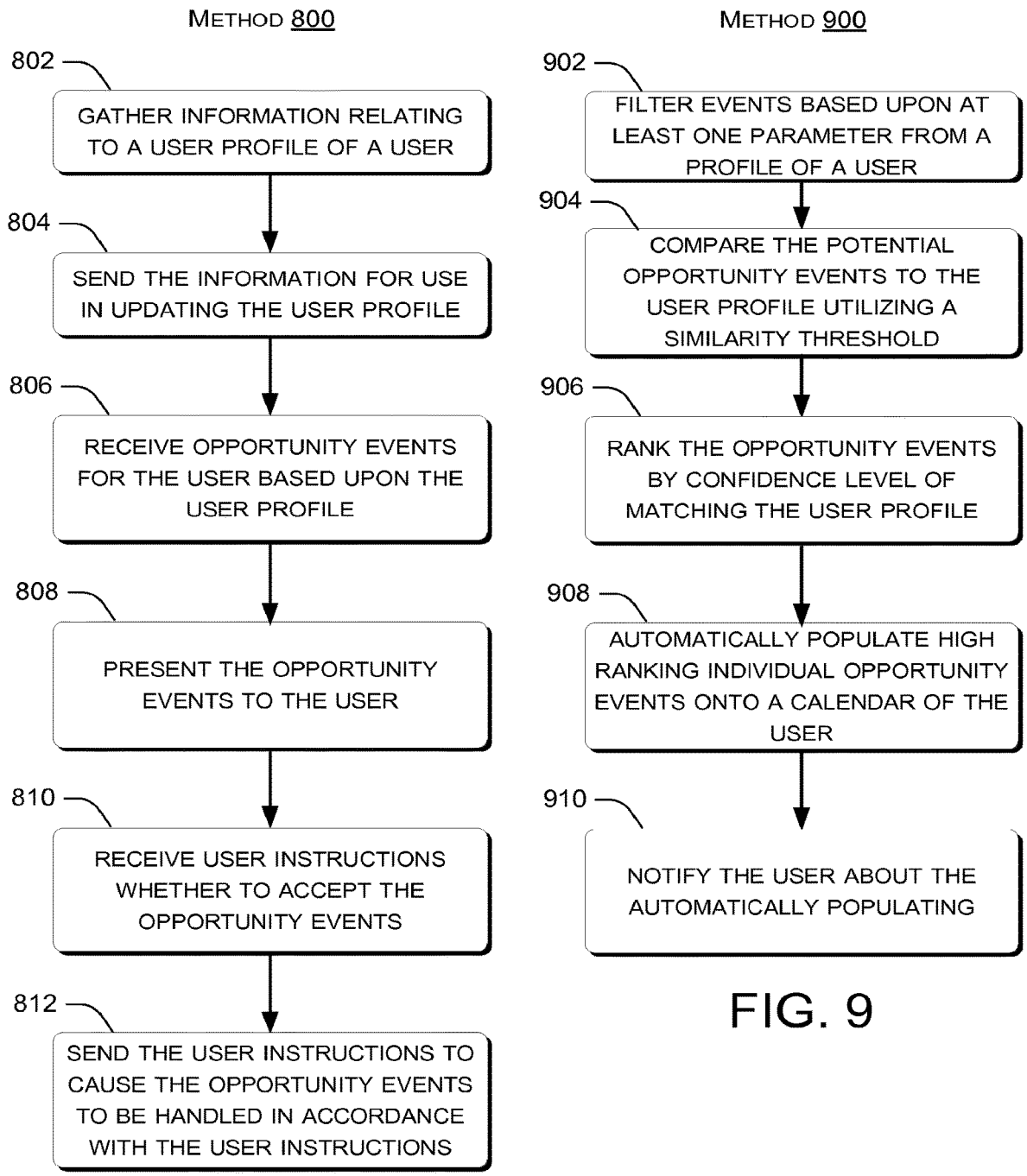
FIGS. 8-9 show examples of opportunity event methods in accordance with some implementations of the present concepts.

FIG. 8 shows a flowchart of a method 800 relating to opportunity events.

The method can gather information relating to a profile of a user (e.g., user profile) at 802. For instance, the information can relate to user calendar information, user email information, user text information, and/or user search history information, among others.

The method can send the information for use in updating the user profile at 804. Thus, the user profile can be dynamic and evolving as additional information becomes available.

The method can receive opportunity events for the user based upon the user profile at 806. For instance, the opportunity events can be received from a remote service that manages the user profile and utilizes the user profile to identify the opportunity events.

The method can present the opportunity events to the user at 808. In some cases, the opportunity events can be automatically populated to a user calendar. A notification about the opportunity events and the autopopulating can be presented to the user. For instance, a notification can be presented to the user about the opportunity events. The notification can be presented to the user using various technologies, such as text or email. In some cases, the user can specify how he/she desires to receive the notification. In other cases the opportunity events can be populated on an opportunity calendar. The user can review the opportunity events and decide which ones he/she is interested in. In some cases, the opportunity calendar can be presented concurrently to a user calendar. The user can move individual opportunity events to the user calendar as desired.

The method can receive user instructions whether to accept the opportunity events at 810. For instance, the user may accept or decline an individual opportunity event. Similarly, if the user moves an opportunity event from the opportunity calendar to the user calendar, this can be deemed an acceptance and the opportunity event can be handled accordingly.

The method can send the user instructions to cause the opportunity events to be handled in accordance with the user instructions at 812. In some cases, all aspects related to opportunity events can be handled by a single device, such as a device belonging to the user, such as a notebook computer, tablet, or smart phone. In other cases, some aspects related to the opportunity events can be managed remotely for presentation on the user device.

Second Method Example

FIG. 9 shows a flowchart of a method 900 relating to opportunity events.

The method can filter events based upon at least one parameter from a profile of a user at 902. The filtering can produce potential opportunity events for the user. In some cases, the events can be received from a remote source, such as a search engine and then filtered. In other cases, the events can be generated and then filtered by the same entity.

The method can compare the potential opportunity events to the user profile utilizing a similarity threshold such that the potential opportunity events that satisfy the similarity threshold are considered opportunity events at 904.

The method can rank the opportunity events by confidence level of matching the user profile at 906.

The method can automatically populate high ranking individual opportunity events onto a calendar of the user at 908. In one example, the high ranking individual opportunity events have a confidence level of at least 0.9. Medium ranking opportunity events can have a confidence level of 0.7 to 0.9. The medium ranking opportunity events can be populated on an opportunity calendar for review by the user. In this example, opportunity events that have a confidence level below 0.7 are not considered further. Of course, these relative values are provided for purposes of explanation and other values are contemplated.

The method can notify the user about the automatically populating at 910. In the case of opportunity events presented on the opportunity calendar, the user can be allowed to move individual opportunity events from the opportunity calendar to the calendar. The method can be performed by various devices. For instance, in one case the method can be performed by the user's device. In another case, the method can be performed by a cloud-based server computer.

The order in which the methods are described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on computer-readable storage medium/ media as a set of instructions such that execution by a computing device causes the computing device to perform the method.

Conclusion

Although techniques, methods, devices, systems, etc. pertaining to opportunity events are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method comprising:
obtaining a geographic location of a device as indicated by a location sensor, the geographic location identifying where a user of the device physically attends a particular type of public event;
based at least on the user's physical attendance at the particular type of public event as indicated by the location sensor, inferring a personal interest of the user in the particular type of public event;
identifying a plurality of future public events of different types that are already scheduled to occur at later times;
based at least on the inferred personal interest of the user, filtering the plurality of future public events to obtain one or more opportunity events that match the inferred personal interest of the user in the particular type of public event; and
outputting the one or more opportunity events to the user.

2. The method of claim 1, wherein the outputting comprises:
causing the one or more opportunity events to be presented differently than one or more other events on a personal calendar of the user.

3. The method of claim 2, wherein the causing comprises:
causing the one or more opportunity events to be presented on an opportunity calendar for the user, the opportunity calendar being separate from the personal calendar of the user.

4. The method of claim 3, wherein the causing comprises:
causing the opportunity calendar to be presented concurrently with the personal calendar of the user.

5. The method of claim 1, further comprising:
using the location sensor, determining whether the user physically attends the one or more opportunity events; and
updating a user profile of the user to identify at least one opportunity event physically attended by the user.

6. The method of claim 5, wherein the location sensor comprises a Global Positioning System (GPS) sensor and the device is a personal device of the user.

7. The method of claim 5, wherein the location sensor comprises an accelerometer and the device is a personal device of the user.

8. A system, comprising:
a processor; and
storage having instructions stored thereon which, when executed by the processor, cause the processor to:
obtain a current geographic location of a user as indicated by a location sensor;
based at least on previous attendance by the user at a particular type of public event as indicated by the location sensor, infer a personal interest of the user in the particular type of public event;
based at least on the inferred personal interest of the user, identify one or more opportunity events that the user may be interested in attending at the current geographic location of the user, the one or more opportunity events comprising future public events already scheduled to occur at the current geographic location of the user; and
output the one or more opportunity events to the user.

9. The system of claim 8, wherein the instructions, when executed by the processor, cause the processor to:

present the one or more opportunity events separately from one or more other events, the one or more other events being presented on a personal calendar of the user.

10. The system of claim 8, wherein the instructions, when executed by the processor, cause the processor to:
present the one or more opportunity events separately from, and concurrently with, one or more other events, the one or more other events being presented on a personal calendar of the user.

11. The system of claim 10, wherein the instructions, when executed by the processor, cause the processor to:
receive a user input identifying a selected opportunity event to add to the personal calendar; and
add the selected opportunity event to the personal calendar responsive to the user input.

12. The system of claim 11, wherein the instructions, when executed by the processor, cause the processor to:
update a user profile of the user to reflect that the user added the selected opportunity event to the personal calendar.

13. The system of claim 12, wherein the instructions, when executed by the processor, cause the processor to:
based at least on the updated user profile, identify another opportunity event that the user may be interested in attending in the future;
using the location sensor, determine that the user physically attends the another opportunity event; and
update the user profile to reflect that the user physically attends the another opportunity event.

14. A device, comprising:
a location sensor;
a processor; and
storage having instructions stored thereon which, when executed by the processor, cause the processor to:
obtain a geographic location of the device from the location sensor when a user of the device is physically attending a particular type of event;
provide the geographic location of the device to an event selection engine that is configured to infer a personal interest of the user in the particular type of event;
receive, from the event selection engine, one or more opportunity events that the user may be interested in attending, the one or more opportunity events being filtered from a plurality of future public events scheduled to occur at later times based at least on the inferred personal interest of the user; and
display the one or more opportunity events on the device.

15. The device of claim 14, the event selection engine being provided on a server that is remote from the device, wherein the instructions, when executed by the processor, cause the processor to:
send the geographic location of the device over a network to the server; and
receive the one or more opportunity events from the server.

16. The device of claim 14, wherein the instructions, when executed by the processor, cause the processor to:
execute the event selection engine locally on the device.

17. The device of claim 16, wherein the instructions, when executed by the processor, cause the processor to:
based at least on the user's physical attendance at the particular type of event, infer the personal interest of the user in the particular type of event; and
select the one or more opportunity events based at least on the one or more opportunity events also being the particular type of event.

18. The device of claim 17, wherein the instructions, when executed by the processor, cause the processor to:
contact a remote search engine over a network to identify the one or more opportunity events.

19. The device of claim 14, embodied as a smart phone.

20. The device of claim 14, the location sensor being a Global Positioning System (GPS) sensor.

* * * * *